United States Patent [19]

Baugher et al.

[11] Patent Number: 5,713,043

[45] Date of Patent: Jan. 27, 1998

[54] METHOD AND SYSTEM IN A DATA PROCESSING SYSTEM FOR EFFICIENT DETERMINATION OF QUALITY OF SERVICE PARAMETERS

[75] Inventors: Mark John Baugher; Alan Palmer Stephens, both of Austin, Tex.

[73] Assignee: International Business Machines Corporation, Armonk, N.Y.

[21] Appl. No.: 368,451

[22] Filed: Jan. 4, 1995

[51] Int. Cl.$^6$ .................................................. G06F 13/14
[52] U.S. Cl. ...................... 395/806; 370/232; 395/200.06
[58] Field of Search .............................. 395/153, 154, 395/162, 163, 164, 165, 806–807, 200.01, 200.06, 200.09, 200.12, 200.13, 680, 682, 830, 672–674; 370/229, 230, 232–236

[56] References Cited

U.S. PATENT DOCUMENTS

| | | | |
|---|---|---|---|
| 4,698,841 | 10/1987 | Haselton et al. | |
| 4,713,806 | 12/1987 | Oberlander et al. | |
| 4,932,024 | 6/1990 | Bonicioli et al. | |
| 4,964,069 | 10/1990 | Ely | 364/521 |
| 5,027,290 | 6/1991 | Kirk | 364/521 |
| 5,109,482 | 4/1992 | Bohrman | 395/154 |
| 5,175,800 | 12/1992 | Galis et al. | |
| 5,179,651 | 1/1993 | Taafe | 395/154 |
| 5,369,744 | 11/1994 | Fukushima | 395/162 |
| 5,375,204 | 12/1994 | Motoyama | 395/164 |
| 5,408,465 | 4/1995 | Gusella et al. | 370/17 |
| 5,533,009 | 7/1996 | Chen | 370/17 |

OTHER PUBLICATIONS

IBM Technical Disclosure Bulletin, vol. 35, No. 4B, Sep. 1992, "Multimedia Network System".

Data Communications, Feb. 1993, by Nick Lippis, Strategic Networks Consulting, Inc., "Multimedia Networking—Restructuring the Enterprise for Video Traffic".

Yuang et al, "BATS: A High–Performance Transport System for Broadband Applications", Local Computer Networks, 1994, 19th Conf., IEEE, pp. 448–455.

Chu et al, "Optimal Bandwidth Allocation of Multiple VBR Video Sources with Priorities"Speech, Image Processing, and Neural Networks, 1994 Int'l. Symposium, IEEE, pp. 365–368.

Lee et al "Call Admission Control for ATM Networks Using Instantaneous QOS Estimates", Tencon '93—1993 IEEE Region 10 Conf. on Computer, Communication, pp. 237–240.

Abe et al, "A Traffic Control Method for Service Quality Assurance in an ATM Network", IEEE Journal on Selected Areas in Communications, v12, n2, pp. 322–331, Feb. 1994.

*Primary Examiner*—Joseph H. Feild
*Attorney, Agent, or Firm*—Jeffrey S. LaBaw; Lisa B. Yociss; Andrew J. Dillon

[57] ABSTRACT

A method and system for the efficient determination of quality of service parameters for multimedia files accessed during operation of a specified multimedia application. Operation of the specified multimedia application is initiated. During operation, the multimedia application accesses multimedia files by reading the data stored in those files. The multimedia files are identified, and each read performed by the multimedia application is analyzed while each multimedia file is accessed. Quality of service parameters for each multimedia file may be automatically determined utilizing the analysis of each read of a multimedia file performed by the multimedia application.

12 Claims, 4 Drawing Sheets

METHOD AND SYSTEM IN A DATA PROCESSING SYSTEM FOR EFFICIENT DETERMINATION OF QUALITY OF SERVICE PARAMETERS

BACKGROUND OF THE INVENTION

1. Technical Field:

The present invention relates to data processing systems, and in particular to data processing systems which reserve resources for multimedia applications. Still more particularly, the present invention relates to the efficient determination of quality of service parameters for a plurality of multimedia files.

2. Description of the Related Art:

Within a data processing system, a system data bus may be utilized to transmit data to and from a central processing unit, direct access storage devices, communications input/output processors, and other peripheral devices. Typically, only one of the several devices connected to the system data bus is able to transmit at any given moment. One of the parameters which establishes the volume of information that the system data bus can transfer within a given period of time, or the capacity of the system data bus, is the bandwidth of the system data bus. The bandwidth of a data bus is the rate, expressed in bytes per second, at which data can be conveyed from one device to another. Such bandwidth is limited by the electrical characteristics of the transceivers connected to the system data bus, and the electrical characteristics of the system data bus itself.

Similarly, a communication link may be utilized to transmit data from one processor to another within a distributed data processing system. Such a communication link also has a finite bandwidth which limits the capacity or volume of information that may be transmitted via the communication link.

Multimedia computer systems are commonly utilized within distributed data processing systems, and are capable of presenting material utilizing a combination of text, graphics, video, animation, and sound utilizing such communication links. These multimedia applications require computer system resources in order to operate. Proper scheduling of these resources is important in order to maintain an efficient, high-quality multimedia presentation.

One such resource is the data transmission capacity, which may be divided among several devices connected to communication channels. A multimedia application may access audio files and/or video files during operation utilizing the communication link. These different files may each require a wide range of the data transmission capacity. For example, CD-ROM audio files which include the sound for a multimedia presentation may be transmitted at a read throughput of 175 kilobytes per second, and compressed, digital video files which include the visual portion of a multimedia presentation may be transmitted at 150 kilobytes per second or greater, while still frame audio rates are about 35 kilobytes per second or less. Therefore, the read throughput for audio and video files may vary greatly.

It is known in the art to define a network reservation interface capable of reserving a portion of the data transmission capacity, or bandwidth of the system. One such implement is defined by the ISDN Frame Relay standard, CCITT Q.933, where fixed read rate and cumulative delay is defined by a given "burst". Burst is defined as a series of successive transfers, or reads. Cumulative delay is the delay that may occur across the whole path of transmission during transmission of the content of the read.

It is recognized that certain data in a network, such as that associated with multimedia, may require priority handling during transmission, Therefore, a "quality of service" has been defined in the literature, which seeks to describe various parameters which may be specified to define certain minimum requirements which must be met for transmission of given data types over the computer system. These quality of service parameters may, then, be utilized by a resource manager utilizing the network reservation interface in order to properly allocate system resources such as bandwidth.

Quality of service parameters may include the read throughput, cumulative delay, and burst values, or read size, for data transmission. Quality of service parameters may be associated with an audio or video file, or a particular audio or video stream within a file. Therefore, each multimedia file, such as an audio or video file, accessed by a multimedia application has associated with it quality of service parameters In addition, a multimedia application may play back multiple audio and/or video files concurrently. Quality of service parameters may also be associated with the multimedia application, in addition to each file accessed by the multimedia application. Quality of service requirements may vary greatly. If these quality of service parameters are not satisfied during the operation of the multimedia application, the sound and video portions of the multimedia presentation may be unintelligible to the user.

Efficient scheduling of resources for the presentation of the multimedia application requires knowledge of the quality of service parameters for the multimedia application, as well as the parameters of each accessed file. However, because quality of service parameters vary greatly among files and applications, quality of service parameters may not be readily known at the time the application plays back, or accesses, the audio and video files.

It is known in the art to define a file structure where some quality of service parameters may be contained in a predefined position preceding an associated video or audio stream within a multimedia file. It is also known to include quality of service information as an extended attribute associated with a file. In these systems, the quality of service parameters are defined and associated with the file at the time the file is created. A resource manager may read this information prior to presenting the audio stream in order to determine the amount of bandwidth to reserve for the presentation of the video or audio stream.

Therefore, it should be apparent that a need exists for a method and system which provides for determination and storage of quality of service parameters for multimedia files which do not have these parameters previously associated with the files.

SUMMARY OF THE INVENTION

It is therefore one object of the present invention to provide an improved data processing system.

It is another object of the present invention to provide an improved data processing system which reserves resources for multimedia applications.

It is yet another object of the present invention to provide an improved data processing system for the efficient determination of quality of service parameters for a plurality of multimedia files.

The foregoing objects are achieved as is now described. A method and system are disclosed for the efficient determination of quality of service parameters for multimedia files accessed during operation of a specified multimedia application. Operation of the specified multimedia application is initiated. During operation, the multimedia application accesses multimedia files by reading the data stored in those files. The multimedia files are identified, and each read performed by the multimedia application is analyzed while each multimedia file is accessed. Quality of service parameters for each multimedia file may be automatically determined utilizing the analysis of each read of a multimedia file performed by the multimedia application.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
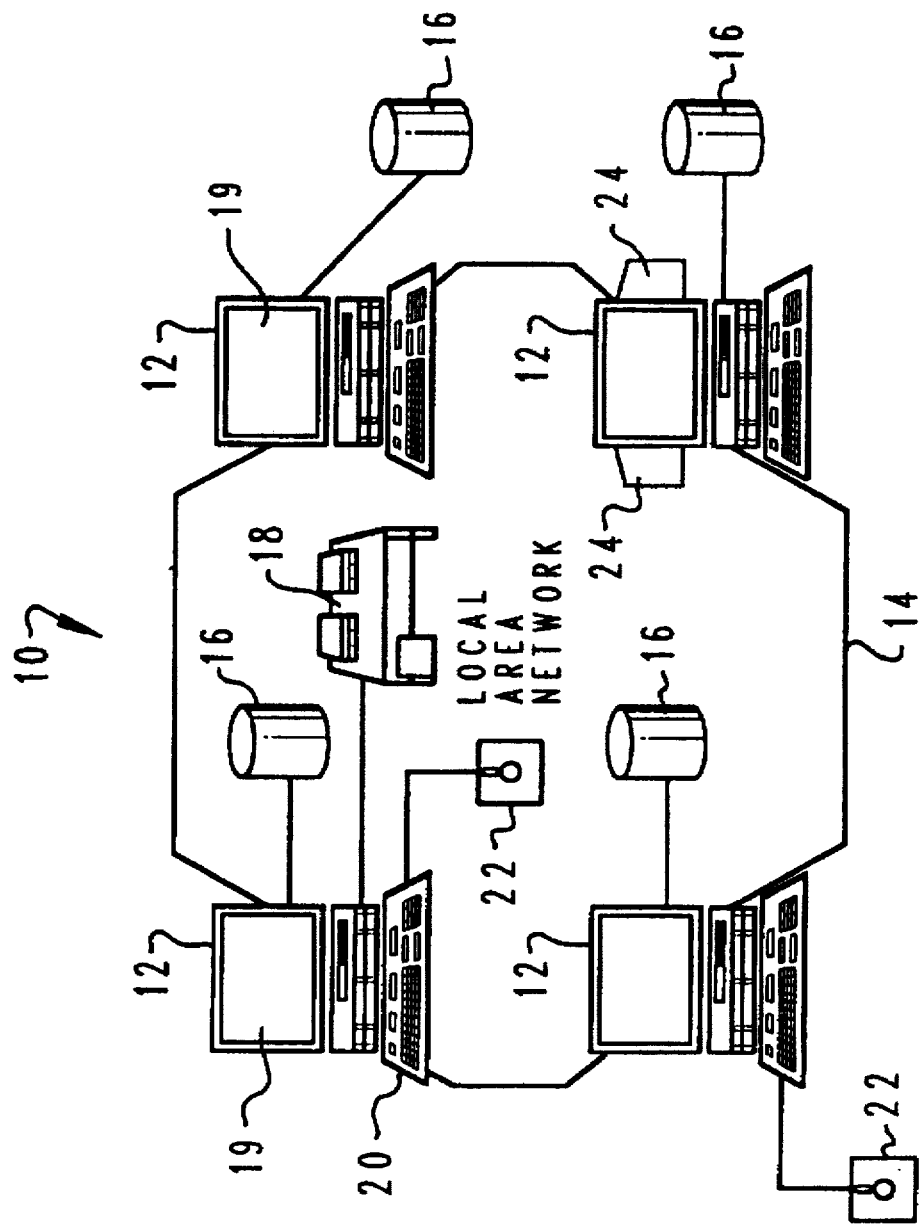
FIG. 1 is a pictorial representation of a data processing system which may be utilized to implement the method and system of the present invention.

With reference now to the figures and in particular with reference to FIG. 1, there is depicted a pictorial representation of a data processing system 10 which may be utilized to implement the method and system of the present invention. In a preferred embodiment, data processing system 10 may include a plurality of computers 12 which may be connected together in a local area network 14. Of course, those skilled in the art will appreciate that a plurality of intelligent workstations coupled to a host processor may be utilized to implement such network.

As is common in such data processing systems, each individual computer may be coupled to a storage device 16 and/or a printer/output device 18. One or more such storage devices may be utilized to store the various data objects or multimedia files which may be periodically accessed, processed, and presented within data processing system 10 in accordance with the method and system of the present invention. In a manner well known in the prior art, each such data processing document or multimedia file may be stored within a storage device which may be associated with a resource manager or library service, which is responsible for maintaining and updating all resource objects associated therewith.

Each computer 12 which may be implemented utilizing any suitably configured personal computer, mini computer, mainframe computer, or a computer running in a distributed network of other computers. Computer 12 has associated therewith a computer display 19, keyboard 20, input pointing device 22, and speakers 24. Those skilled in the art will appreciate that input pointing devices 22 may be implemented utilizing a pointing stick, a mouse, a track ball, or a pen.

Figure 2A:
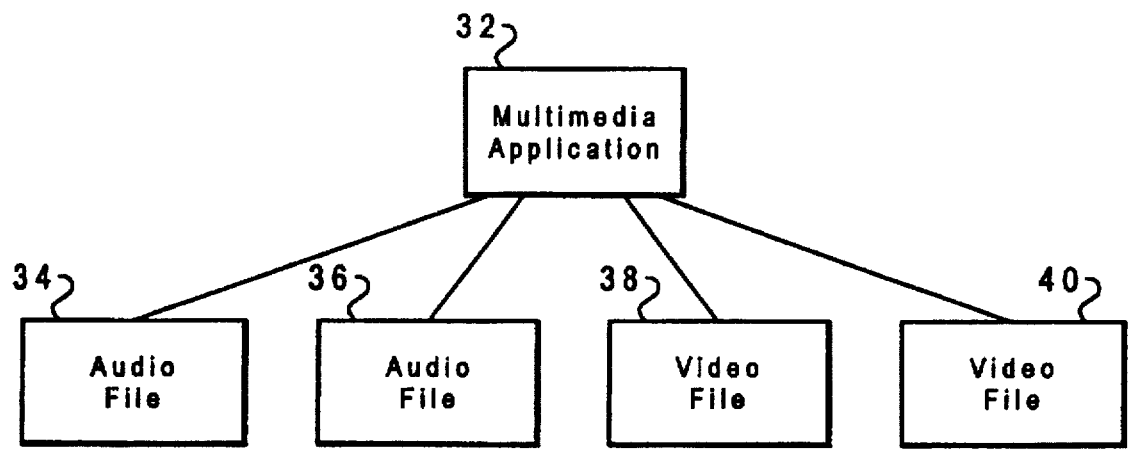
FIG. 2A is a pictorial representation of a multimedia application 32 and the files that multimedia application 32 accesses and presents in accordance with the method and system of the present invention.

Referring now to FIG. 2A, there is depicted a pictorial representation of a multimedia application 32 and the multimedia files that multimedia application 32 accesses and presents in accordance with the method and system of the present invention. Data processing system 10 may be utilized to present multimedia application 32 which may include a variety of text, graphics, video, animation, and sound. The text, graphics, video, animation, and sound portions of multimedia application 32 may be stored separately in multimedia files which are then accessed at the appropriate time during the presentation of multimedia application 32. Multimedia application 32 may access one multimedia file and present its contents before accessing and presenting another multimedia file, or multimedia application 32 may access and present multiple multimedia files concurrently.

For example, multimedia application 32 may access and present the contents of audio file 34, audio file 36, video file 38, and video file 40. Each multimedia file accessed by multimedia application 32 will most likely have different quality of service parameters including a different read throughput and different read size, or burst. Audio file 34 may have a read throughput of 44 kilobytes per second and a burst of 8 kilobytes per read. Audio file 36 may have a read throughput of 176 kilobytes per second and a burst of 64 kilobytes per read. Video file 38 may have a read throughput of 150 kilobytes per second and a burst of 64 kilobytes per read. Video file 40 may have a read throughput of 300 kilobytes per second and a burst of 64 kilobytes per read.

Figure 2B:
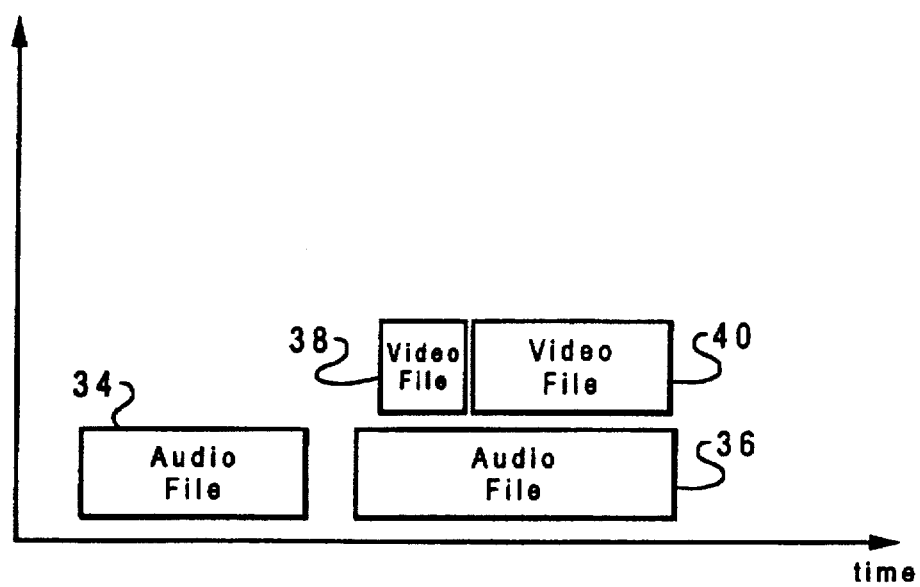
FIG. 2B is a pictorial representation of the time during which video and audio files are accessed by multimedia application 32 in accordance with the method and system of the present invention.

Referring to FIG. 2B, there is depicted a pictorial representation of the time during which video and audio files are accessed by multimedia application 32 in accordance with the method and system of the present invention. Multimedia application 32 will first access and present the contents of audio file 34. Thereafter, multimedia application 32 will access and present the contents of audio file 36. While audio file 36 is being accessed and presented, multimedia application 32 will also being accessing and presenting the contents of video file 38. The presentation of video file 38 will end while audio file 36 is still being presented. The contents of video file 40 will then be accessed and presented while the presentation of audio file 36 continues.

Figure 3:
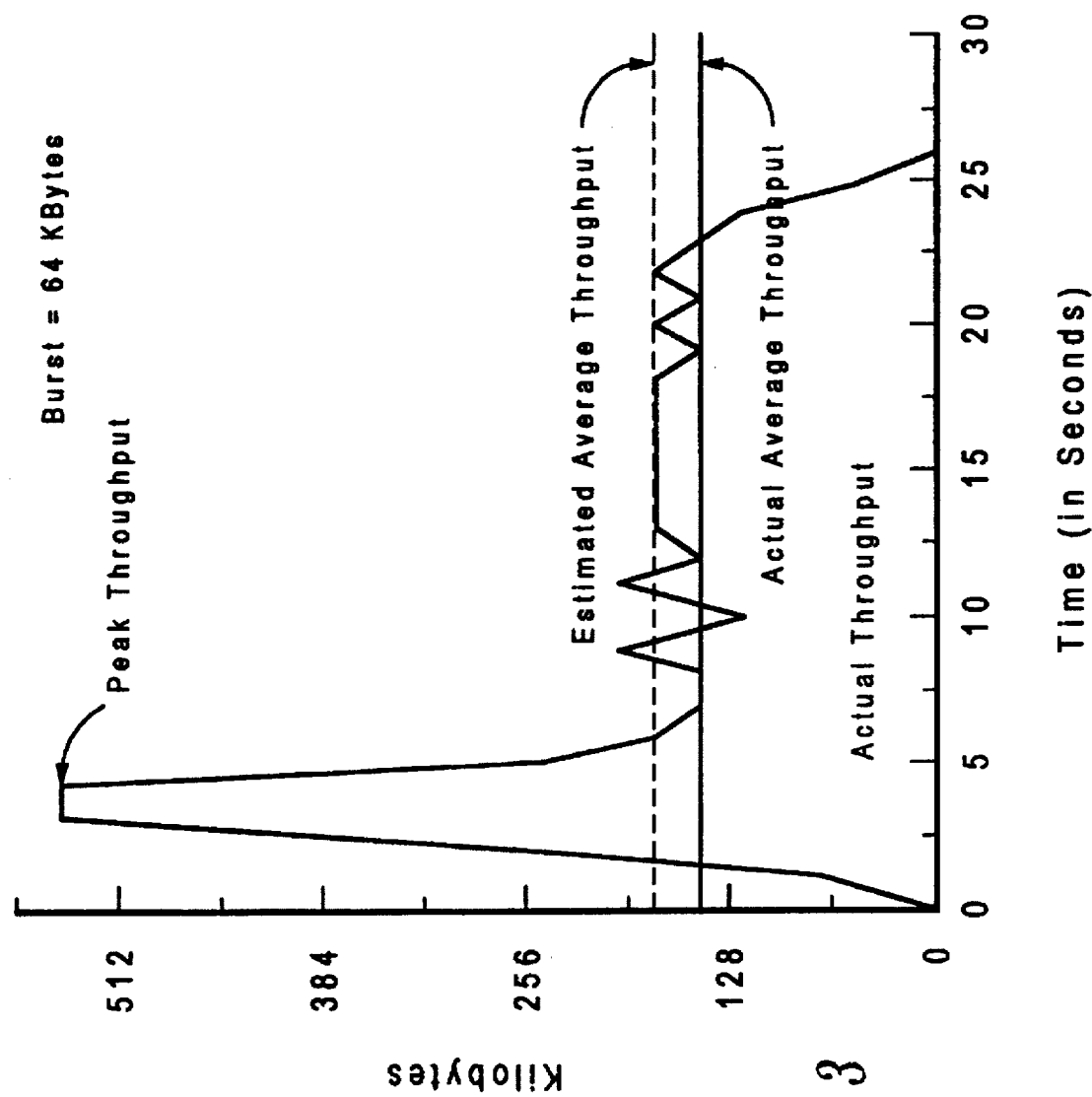
FIG. 3 depicts a graphical representation of the read throughput of a 30-second production level video file determined in accordance with the method and system of the present invention.

FIG. 3 depicts a graphical representation of the approximate average read throughput of a 30-second production level video file determined in accordance with the method and system of the present invention. The approximate read throughput of a file may be calculated as follows:

$$T_r = \frac{1}{t_n - t_1} \times \sum_{i=1}^{n} R_i$$

where n is the number of reads measured by the method and system of the present invention, $t_n$ is the recorded time of the nth read, $t_1$ is recorded time of the first read, and $R_1$ is the read size of the ith read from the file.

The burst size may be determined by determining the size of each read as it occurs. In most cases, the burst size should be constant. Thus, the two shortest reads that are determined should be discarded, with the burst size calculated by averaging the remaining read size values.

Figure 4:
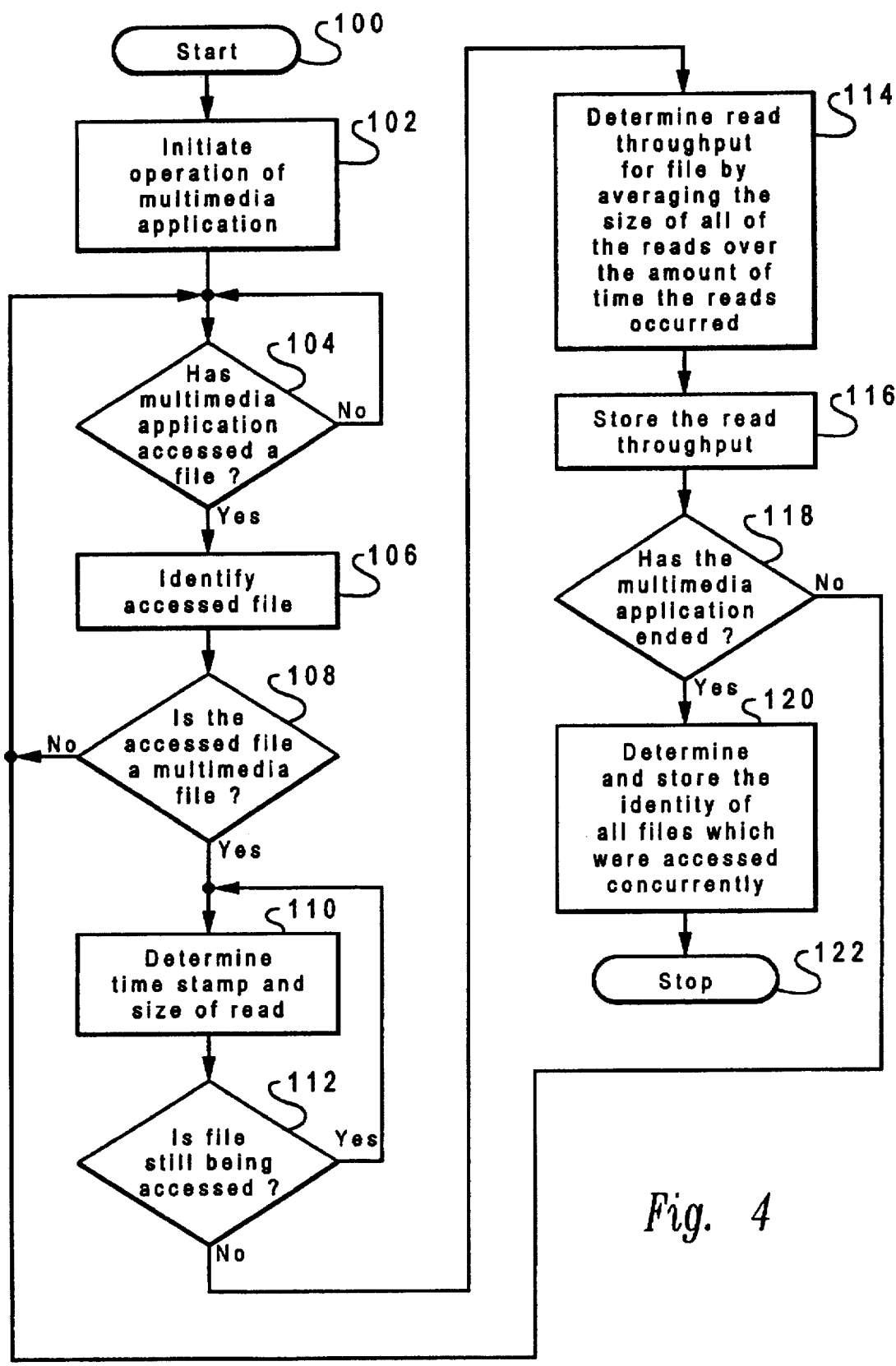
FIG. 4 depicts a high level flow chart which illustrates the determination of quality of service parameters for multimedia files accessed by multimedia application 32 in accordance with the method and system of the present invention.

FIG. 4 depicts a high level flow chart which illustrates the determination of quality of service parameters for multimedia files accessed by multimedia application 32 in accordance with the method and system of the present invention. The process starts as depicted at block 100 and thereafter passes to block 102 which illustrates initiating the operation of multimedia application 32. Next, block 104 depicts a determination of whether or not multimedia application 32 has accessed a file. If a determination is made that multimedia application 32 has not accessed a file, the process passes back to block 104. If a determination is made that multimedia application 32 has accessed a file, the process passes to block 106.

Block 106 depicts the identification of the file accessed by multimedia application 32. Each file includes a file "handle", an identifier assigned by data processing system 10 upon opening the file, which identifies the file, and is read by multimedia application 32 when the file is accessed. Included within this file handle is an identification of whether the file is a multimedia file, such as an audio or video file. Next, block 108 illustrates a determination of whether or not the file accessed by the multimedia application is a multimedia file. If a determination is made that the file is not a multimedia file, the process passes back to block 104.

Referring again to block 108, if a determination is made that the file is a multimedia file, the process passes to block 110 which depicts a determination of the time stamp of the read, the time the read occurred, and the size of the read. The size of the read is commonly called the "burst". Thereafter, block 112 illustrates a determination of whether or not the file is still being accessed by multimedia application 32. If a determination is made that the file is still being accessed, the process passes back to block 110.

Referring again to block 112, if a determination is made that the file is no longer being accessed, the process passes to block 114 which depicts a determination of the read throughput for the file which had been accessed by averaging the size of all of the read operations over the amount of time the read operations occurred. The formula discussed above in conjunction with FIG. 3 is utilized to determine the read throughput. Thereafter, block 116 illustrates the storage of the calculated read throughput for later use by a resource manager in order to maintain an acceptable level of quality of service during presentation of the multimedia file.

Thereafter, the process passes to block 118 which illustrates a determination of whether or not operation of multimedia application 32 has ended. If a determination is made that operation has not ended, the process passes back to block 104. Referring again to block 118, if a determination is made that operation has ended, the process passes to block 120 which depicts a determination and storage of the identity of all multimedia files which were accessed concurrently. The identity of all multimedia files which were accessed concurrently may be utilized to determine a quality of service for multimedia application 32. A resource manager may retrieve the quality of service for multimedia application 32 and utilize it to improve the multimedia presentation produced utilizing multimedia application 32. Thereafter, the process terminates as depicted at block 122. For example, when two multimedia files are presented, the bandwidth of the communication link must be large enough to accommodate the concurrent presentation of both multimedia files.

While the invention has been particularly shown and described with reference to a preferred embodiment, it will be understood by those skilled in the art that various changes in form and detail may be made therein without departing from the spirit and scope of the invention.

We claim:

1. A method in a data processing system for efficiently determining quality of service parameters for a plurality of multimedia files accessed during operation of a specified multimedia application, said data processing system including a storage device, said method comprising the steps of:

initiating operation of said specified multimedia application;

identifying each of said plurality of multimedia files accessed by said specified multimedia application, wherein said specified multimedia application reads data stored in each of said plurality of multimedia files;

analyzing each read performed by said specified multimedia application while said specified multimedia application is accessing each of said plurality of multimedia files; and automatically determining quality of service parameters for each of said plurality of multimedia files utilizing said analysis of each read performed by said specified multimedia application.

2. The method in a data processing system for efficiently determining quality of service parameters associated with a plurality of multimedia files according to claim 1, wherein said step of automatically determining quality of service parameters further includes the steps of:

determining a size of said each read performed by said specified multimedia application; and determining a time when said each read performed by said specified multimedia application occurred.

3. The method in a data processing system for efficiently determining quality of service parameters associated with a plurality of multimedia files according to claim 2, further including the step of determining a read throughput for each of said plurality of multimedia files utilizing said determined size of said each read and said determined time when said each read occurred.

4. The method in a data processing system for efficiently determining quality of service parameters associated with a plurality of multimedia files according to claim 3, further including the step of storing said read throughput within said storage device.

5. The method in a data processing system for efficiently determining quality of service parameters associated with a plurality of multimedia files according to claim 4, further comprising the step of determining which of said plurality of multimedia files were accessed by said specified multimedia application concurrently utilizing said determined time when said each read occurred.

6. The method in a data processing system for efficiently determining quality of service parameters associated with a plurality of multimedia files according to claim 5, further comprising the step of storing said determining of which of said plurality of multimedia files were accessed by said specified multimedia application concurrently in said storage device.

7. A data processing system for efficiently determining quality of service parameters for a plurality of multimedia files accessed during operation of a specified multimedia application, said data processing system including a storage device, comprising:

means for initiating operation of said specified multimedia application;

means for identifying each of said plurality of multimedia files accessed by said specified multimedia application, wherein said specified multimedia application reads data stored in each of said plurality of multimedia files;

means for analyzing each read performed by said specified multimedia application while said specified multimedia application is accessing each of said plurality of multimedia files; and means for automatically determining quality of service parameters for each of said plurality of multimedia files utilizing said analysis of each read performed by said specified multimedia application.

8. The data processing system for efficiently determining quality of service parameters associated with a plurality of multimedia files according to claim 7, wherein said means for automatically determining quality of service parameters further comprises:

means for determining a size of said each read performed by said specified multimedia application; and means for determining a time when said each read performed by said specified multimedia application occurred.

9. The data processing system for efficiently determining quality of service parameters associated with a plurality of multimedia files according to claim 8, further comprising means for determining a read throughput for each of said plurality of multimedia files utilizing said determined size of said each read and said determined time when said each read occurred.

10. The data processing system for efficiently determining quality of service parameters associated with a plurality of multimedia files according to claim 9, further comprising means for storing said read throughput within said storage device.

11. The data processing system for efficiently determining quality of service parameters associated with a plurality of multimedia files according to claim 10, further comprising means for determining which of said plurality of multimedia files were accessed by said specified multimedia application concurrently utilizing said determined time when said each read occurred.

12. The data processing system for efficiently determining quality of service parameters associated with a plurality of multimedia files according to claim 11, further comprising means for storing said determining of which of said plurality of multimedia files were accessed by said specified multimedia application concurrently in said storage device.

* * * * *